(12) United States Patent
Li

(10) Patent No.: US 10,859,065 B1
(45) Date of Patent: Dec. 8, 2020

(54) SUPPLEMENTAL PROPULSION SYSTEM FOR VEHICLES

(71) Applicant: Li Li, Fairfax, VA (US)

(72) Inventor: Li Li, Fairfax, VA (US)

(*) Notice: Subject to any disclaimer, the term of this patent is extended or adjusted under 35 U.S.C. 154(b) by 0 days.

(21) Appl. No.: 16/807,261

(22) Filed: Mar. 3, 2020

Related U.S. Application Data

(60) Provisional application No. 62/947,176, filed on Dec. 12, 2019.

(51) Int. Cl.
F03D 7/06 (2006.01)
F03D 3/04 (2006.01)
F03D 3/00 (2006.01)

(52) U.S. Cl.
CPC ............... F03D 7/06 (2013.01); F03D 3/002 (2013.01); F03D 3/005 (2013.01); F03D 3/04 (2013.01)

(58) Field of Classification Search
CPC ... F03D 7/06; F03D 3/00; F03D 3/002; F03D 3/008; F03D 3/007; F03D 3/04
See application file for complete search history.

(56) References Cited

U.S. PATENT DOCUMENTS

| 1,640,891 | A | * | 8/1927 | Fritzel | B63H 9/02 415/90 |
| 1,665,533 | A | * | 4/1928 | Dally | B64C 23/08 244/21 |
| 2,713,392 | A | * | 7/1955 | Von Karman | F03D 3/007 114/102.13 |
| 4,113,299 | A | * | 9/1978 | Johnson | B62D 35/001 188/2 R |
| 4,292,540 | A | | 9/1981 | Thompson et al. | |
| 4,502,724 | A | * | 3/1985 | Grenadier | B60K 16/00 296/180.1 |
| 6,142,091 | A | | 11/2000 | Henriksen | |
| 8,134,247 | B2 | * | 3/2012 | Gu | F03D 3/002 290/44 |
| 9,032,890 | B2 | | 5/2015 | Winkler | |
| 9,540,087 | B2 | * | 1/2017 | Winkler | F15D 1/12 |
| 2013/0291775 | A1 | * | 11/2013 | Wobben | B63H 9/02 114/39.3 |
| 2016/0281686 | A1 | * | 9/2016 | Hakeem | F03D 3/04 |
| 2016/0327073 | A1 | * | 11/2016 | Amlani | F15D 1/007 |

FOREIGN PATENT DOCUMENTS

| FR | 2948094 | 1/2011 |
| GB | 2102755 A | 2/1983 |

* cited by examiner

Primary Examiner — Jacob D Knutson
Assistant Examiner — Michael R Stabley
(74) Attorney, Agent, or Firm — Kolitch Romano LLP

(57) ABSTRACT

A supplemental propulsion system for a vehicle may include a Flettner rotor. The Flettner rotor includes a rotatable cylinder mounted on a vehicle, e.g., either horizontally or vertically. An airflow deflector is located on the vehicle behind (i.e., downwind of) the Flettner rotor, and the airflow deflector is configured to redirect a vehicle headwind to generate an airflow past the cylinder in a direction transverse to the headwind. An electronic controller may be configured to control a motor to rotate the cylinder. In some examples, the rotational speed of the cylinder is maintained at a selected multiple of a speed of the airflow past the cylinder.

28 Claims, 10 Drawing Sheets

SUPPLEMENTAL PROPULSION SYSTEM FOR VEHICLES

CROSS-REFERENCES

This application claims the benefit under 35 U.S.C. § 119(e) of the priority of U.S. Provisional Patent Application Ser. No. 62/947,176, filed Dec. 12, 2019, the entirety of which is hereby incorporated by reference for all purposes.

FIELD

This disclosure relates to systems and methods for supplementing the propulsion of land vehicles, seagoing vessels, and other forms of transportation. More specifically, the disclosed embodiments relate to Flettner rotor-based supplemental propulsion systems for vehicles.

INTRODUCTION

Natural winds, induced by atmospheric circulation, have long been a source of renewable energy solutions for human civilization. In maritime transportation, harnessing wind power to propel sailing ships dates back thousands of years. Despite the extreme variability of wind conditions, wind propulsion was the norm for many centuries, until propeller-based propulsion replaced the sails.

In the 1920s, attempts were made to utilize powered vertical Flettner rotors, usually 18-to 30-meter tall cylinders above the deck, to propel seagoing vessels. These rotors took advantage of the Magnus effect: a vertical rotating cylinder in cross wind can produce propulsion significantly greater than a sail of equal reference area. Two of these rotor ships, named the Baden-Baden and the Barbara, were built in 1920 and 1926, respectively. The rotors were used as a supplementary source of propulsion to reduce fuel consumption. The success of these ships proved the efficiency and seaworthiness of the rotor sails. Unfortunately, the projects ended without commercial adoption due to concerns of lengthy depreciation and presumed risks regarding stability in rough weather.

Interests in rotor ships revived in recent years, and a number of rotor sails have been used by commercial ships. However, the old barriers to use of rotor sails remain. Structural integrity and stability of the ship in adverse weather conditions are still the top concerns. Costs of capital and lack of verifiable data on the fuel savings potential is another key barrier. One Flettner rotor unit for a ship can cost over $2 million due to its immense size.

Current wind energy conversion technology focuses exclusively on natural winds, which vary dramatically in speed, direction, and duration, as well as regional and seasonal changes. This variability has a large impact on the effectiveness of wind energy conversion.

SUMMARY

The present disclosure provides systems, apparatuses, and methods relating to wind energy based vehicle propulsion systems.

In some embodiments, a supplemental propulsion system for a vehicle may include: a Flettner rotor including a rotatable cylinder mounted to a vehicle, such that a length of the cylinder is oriented transverse to a direction of travel of the vehicle; and an airflow deflector disposed on the vehicle behind the Flettner rotor, wherein the airflow deflector is configured to redirect a vehicle headwind to generate an airflow past the cylinder in a direction transverse to the direction of travel.

In some embodiments, a method for providing supplemental propulsion to a vehicle, the method comprising: redirecting a headwind of a vehicle to generate a redirected airflow transverse to the headwind, using an airflow deflector coupled to the vehicle; and generating a Magnus force on the vehicle by spinning a cylinder disposed in the redirected airflow.

Features, functions, and advantages may be achieved independently in various embodiments of the present disclosure, or may be combined in yet other embodiments, further details of which can be seen with reference to the following description and drawings.

DETAILED DESCRIPTION

Figure 1:
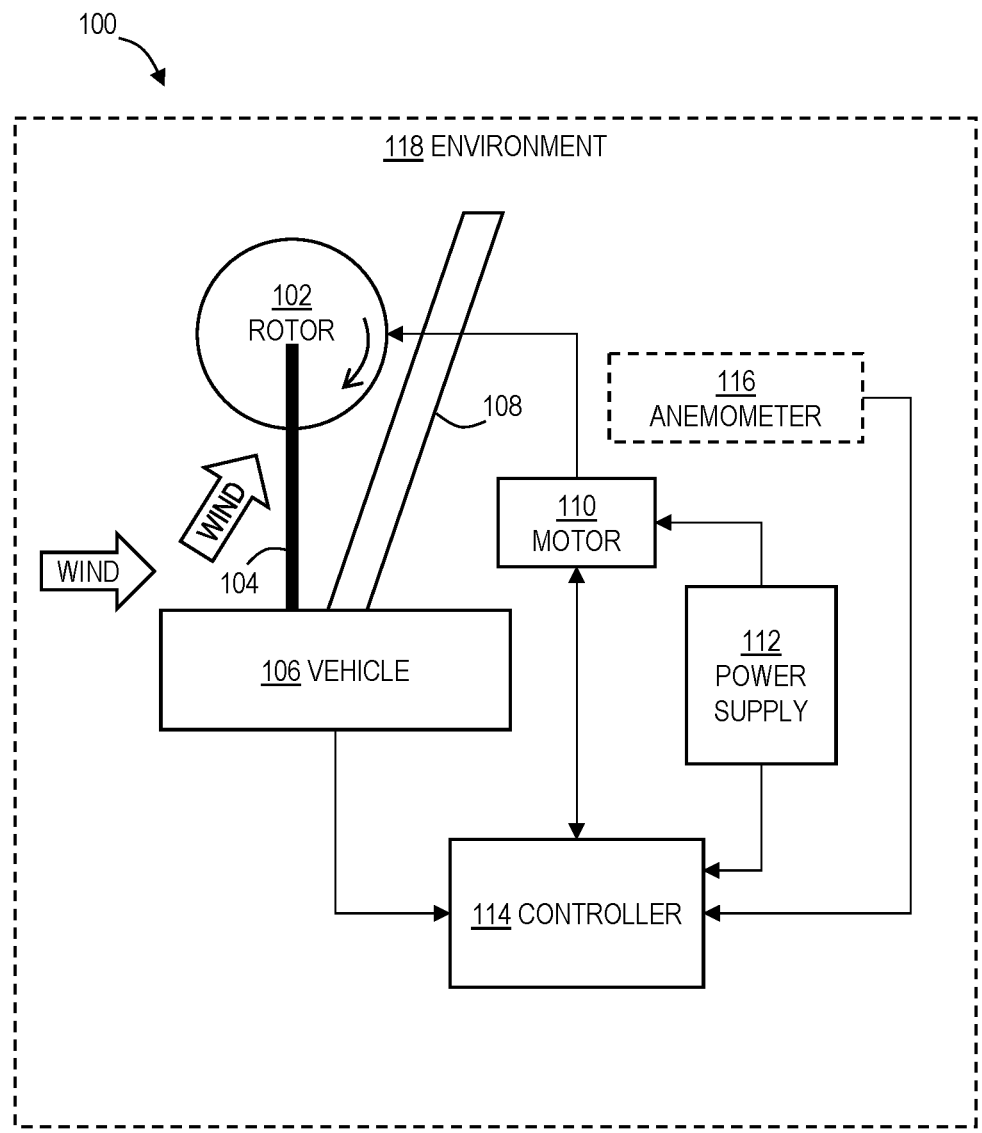
FIG. 1 is a schematic diagram of a wind energy-based vehicle propulsion system according to the present teachings.

Various aspects and examples of a wind energy based supplemental propulsion system, as well as related methods, are described below and illustrated in the associated drawings. Unless otherwise specified, a supplemental propulsion system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through C, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a wind energy based supplemental vehicle propulsion system in accordance with the present teachings may include a Flettner rotor mounted on a vehicle in a location open to the airflow caused by the vehicle's headwind, and a deflector configured to redirect the airflow in a direction transverse to a direction of vehicle travel. This redirected airflow passes over the spinning rotor, thus generating forces generally in the direction of vehicle travel. In some examples, the Flettner rotor is mounted horizontally, and the deflector redirects the airflow upward (or downward) past the rotor. In some examples, the Flettner rotor is mounted vertically, and the deflector redirects the airflow laterally (i.e., sideways) past the rotor. Depending on selected factors, interaction between the rotor and the airflow may also result in a lifting force.

In ground transportation, a moving vehicle passes through stationary air, and transfers part of the vehicle's kinetic energy to the air. The energy lost by the vehicle is called aerodynamic drag. Kinetic energy lost to the air increases exponentially with vehicle speed, and can account for more than half of the vehicle's kinetic energy losses. Known aerodynamic technologies have focused on reducing the drag coefficient, e.g., by modifying the body shape of the vehicle.

Fundamentally different from the natural winds, vehicle headwind is an artificially produced air movement at local or vehicle scale. Vehicle headwinds are caused by the relative motion between a vehicle and the generally stationary air, while natural winds result from the difference in solar energy absorption between the climate zones on Earth. In contrast to natural winds, vehicle headwind has high speed with fixed direction relative to the vehicle, and is persistent over an entire journey. This makes vehicle headwind an excellent source of renewable energy.

The present disclosure describes a wind-assisted supplemental propulsion apparatus for ground transportation (e.g., for semi-trucks) configured to reduce fuel consumption. Fuel savings increases exponentially with vehicle speed. In some examples, e.g., for a typical class 8 vehicle (e.g., internal combustion engine (ICE) semi-truck), fuel savings can be about 17%, 28%, and 34% at the vehicle speed of 45 mph, 65 mph, and 75 mph, respectively. Fuel savings for electric semi-trucks are generally 3% to 5% more than ICE semi-trucks. Further fuel savings can be realized if more than one of the devices are installed.

The fuel savings is achieved by harnessing the wind energy generated by vehicle motion, namely the vehicle headwind, using a combination of an airflow deflector and a Flettner rotor. The airflow deflector redirects the airflow of the headwind from a longitudinal direction (i.e., in line with a length of the vehicle) to a transverse direction, e.g., generally vertical or generally lateral (i.e., sideways). The Flettner rotor is configured to actively rotate, such that Magnus forces provide a supplemental propulsion to the vehicle (e.g., in a forward direction). The forward-pointing Magnus force provides a secondary propulsion and, in some cases, the upward Magnus force, which is relatively small for large deflector angles of attack, reduces the vehicle's tire rolling resistance. A motor drives the rotor at high speed, e.g., using a standalone and/or vehicle-based power supply. A controller adjusts and maintains the rotor speed at a selected setpoint or range relative to the vehicle and/or wind speed. For example, rotation speed may be held at three times the airflow speed.

Longitudinal airflow direction is changed using the airflow deflector. In horizontal rotor examples, the deflector is configured to create a generally upward or vertical airflow at the cost of additional air drag. In vertical rotor examples, the deflector is configured to create a generally sideways or lateral airflow, again at the cost of additional air drag. In some examples, the deflector drag coefficient is up to 1.2, which is high from an aerodynamic perspective but relatively small compared to the beneficial Magnus forces generated. The rotating Flettner rotor cylinder, e.g., with endplates, is positioned in the redirected airflow to generate a propulsion force in the forward moving direction and, in some cases, a lifting force in the upward direction. Such a Flettner rotor operating at a high revolutions per minute (RPM) and Reynold number can generate a lift coefficient of 8 or greater, and may reach 14 depending on the rotor design. Similar to the air drag force against the moving vehicle, such a lift is proportional to wind speed squared and can more than count the air drag of the entire vehicle, especially at high wind speed.

Examples, Components, and Alternatives

The following sections describe selected aspects of illustrative supplemental propulsion systems for vehicles, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Supplemental Propulsion System for Vehicles

As shown in FIGS. 1-18, this section describes illustrative supplemental propulsion systems for vehicles. These systems are examples of the supplemental propulsion systems described in the Overview above. Where horizontal Flettner rotor systems are described below, it is to be understood that similar features and results are applicable to the vertical (or any other) orientation, and vice versa. Furthermore, it is to be understood that similar effects can be achieved where water is the fluid medium rather than air (e.g., for submarines and boats).

FIG. 1 is a schematic system diagram of a system 100, which includes a cylindrical rotor 102 rotatably coupled to a riser or rotor mount 104. Mount 104 is coupled to a vehicle 106 upwind of an airflow deflector 108 configured to redirect the headwind of the vehicle past the rotor in a direction transverse to the headwind (i.e., transverse to a direction of travel of the vehicle). This direction may be upward, downward, or sideways, depending on the orientation of the deflector and rotor. Rotor 102 is driven by a motor 110, which may include any suitable motor, such as an electric motor and/or a hub motor. In some examples, motor 110 is an external motor coupled to the rotor by a gearbox, a transmission, and/or the like. Motor 110 and other components of system 100 are powered by a power supply 112, which may include any suitable power source, such as battery power, solar power, vehicle-generated power, and/or the like. An electronic controller 114 is configured to receive inputs, such as a wind speed input from an anemometer 116 and/or a vehicle speed input from vehicle 106, and to control the rotational speed of rotor 102 via motor 110. For example, rotor speed may be controlled at a setpoint or within a range relative to wind speed past the rotor. Anemometer 116 may measure the headwind velocity and/or the redirected airflow velocity (i.e., in the vicinity of the rotor). Vehicle 106 and system 100 operate in an environment 118, such as outdoors while travelling down a roadway (e.g., a highway or freeway).

Figure 2:
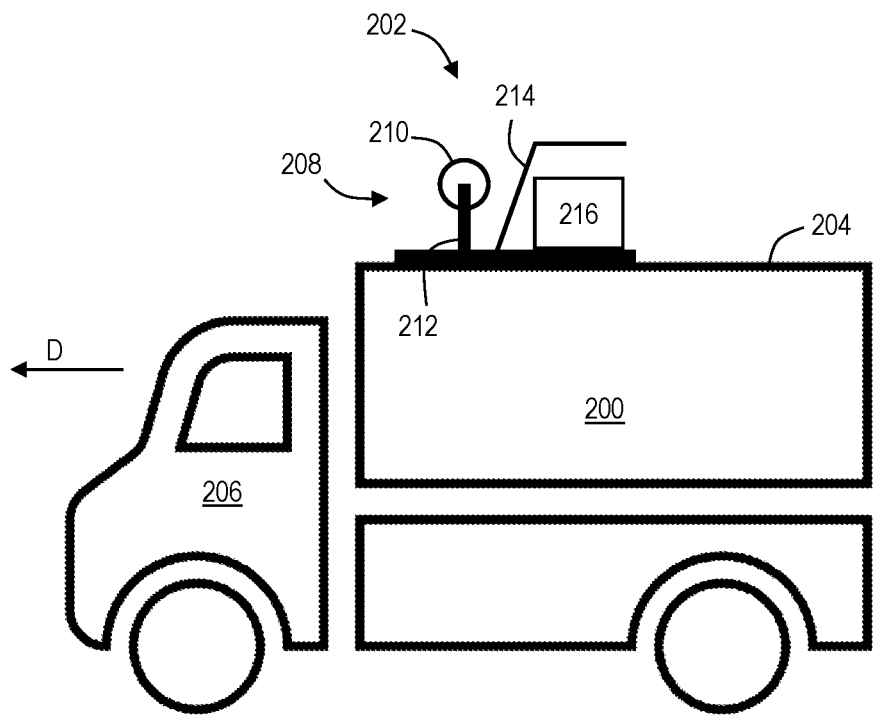
FIG. 2 is a side view of an illustrative vehicle having a rotor system of the present disclosure.
Figure 3:
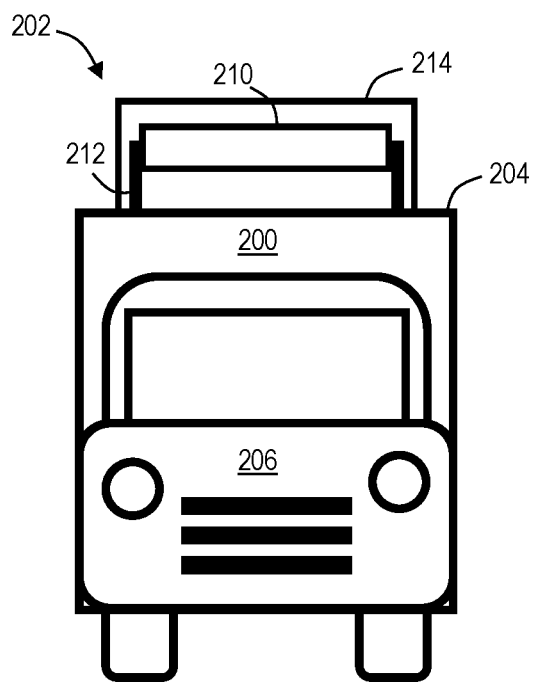
FIG. 3 is a front view of the vehicle and rotor system of FIG. 2.

FIGS. 2 and 3 depict an illustrative vehicle 200, which is an example of vehicle 106, having a supplemental propulsion system 202 mounted thereon, which is an example of system 100. In this example, vehicle 200 is a truck, and system 202 is coupled to a roof 204 of the truck, aft of a cab 206 of the truck. As shown in FIGS. 2 and 3, system 202 includes a horizontally-mounted Flettner rotor 208 having an elongate cylinder 210 disposed with a long axis oriented transverse (e.g., at a right angle) to a direction of travel (D) of the vehicle. Cylinder 210 is held above roof 204 by a rotor mount 212.

An airflow deflector 214 is mounted to vehicle 200 immediately behind rotor 208, such that redirected wind passes over the cylinder. In the present example, airflow deflector 214 is a generally flat (e.g., planar) plate, mounted at an angle transverse to roof 204, such that the top of the deflector is farther rearward than the base of the deflector. A drive and sensor assembly 216 is coupled to vehicle 200 and/or system 202 in a suitable location, e.g., behind deflector 214. Drive and sensor assembly 216 includes components described above with respect to system 100, such as an anemometer and an electronic controller. In some examples, drive and sensor assembly 216 includes a motor. In some examples, the motor is a hub motor, disposed in or adjacent to cylinder 210.

Figure 4:
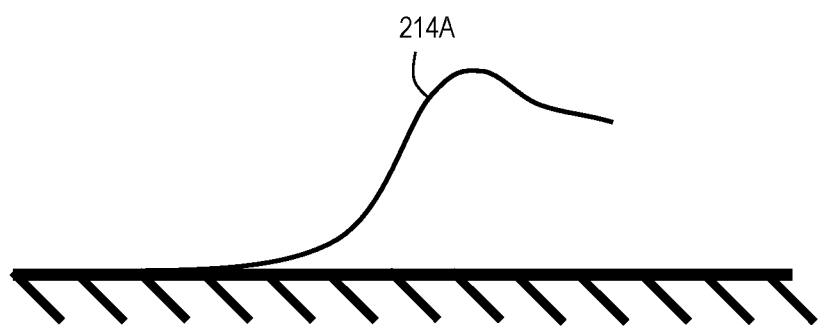
FIG. 4 is a schematic side view of a first illustrative deflector having a first form factor in accordance with aspects of the present disclosure.
Figure 5:
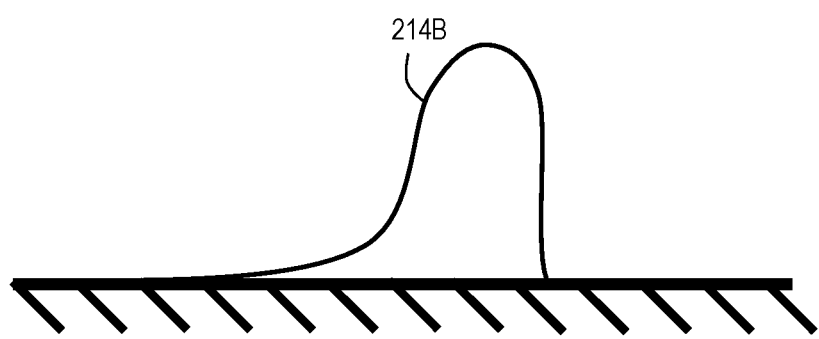
FIG. 5 is a schematic side view of a second illustrative deflector having a second form factor in accordance with aspects of the present disclosure.

FIGS. 4 and 5 depict side profiles of other examples of airflow deflectors, namely a deflector 214A and a deflector 214B, each of which has a curvilinear profile and a windward face with a different angle of attack.

Figure 6:
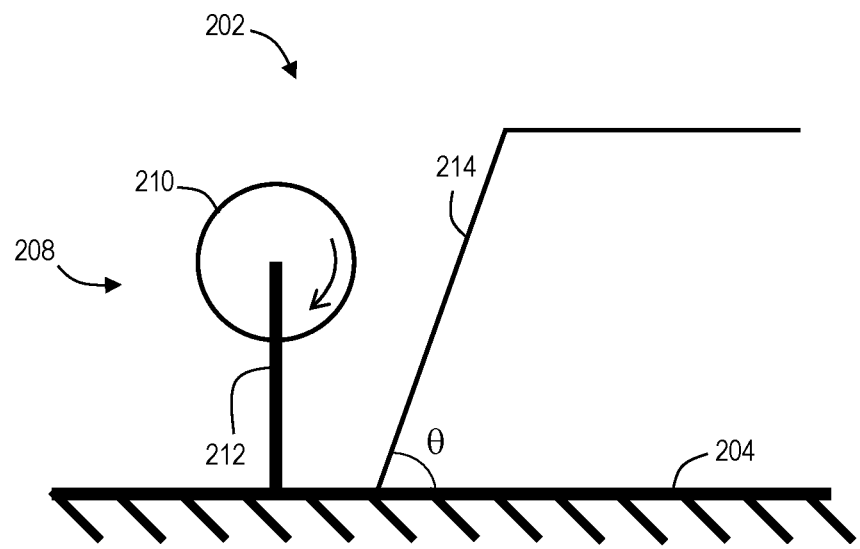
FIG. 6 is a schematic side view of an illustrative wind energy-based vehicle propulsion system in accordance with aspects of the present disclosure.
Figure 7:
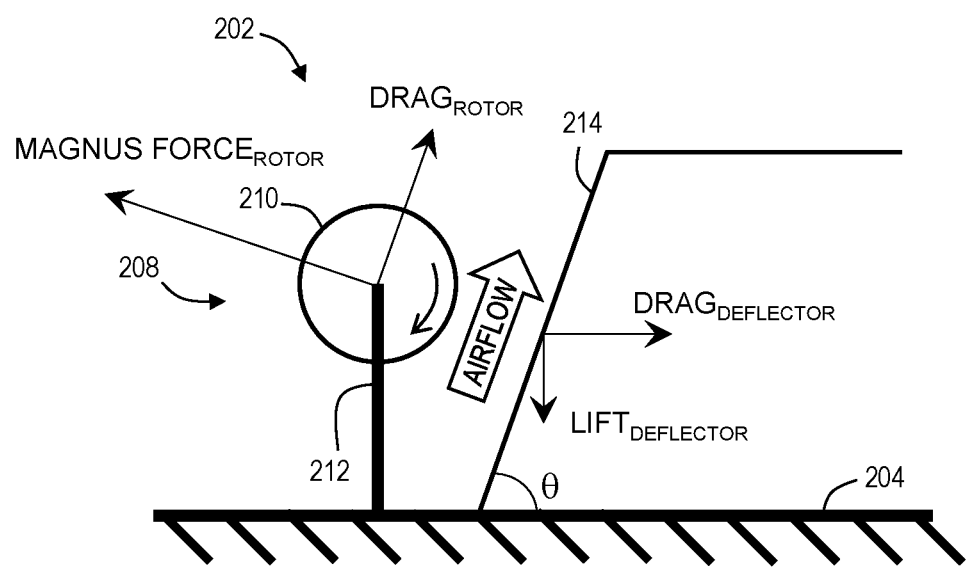
FIG. 7 depicts the system of FIG. 6 with selected force vectors superimposed.
Figure 8:
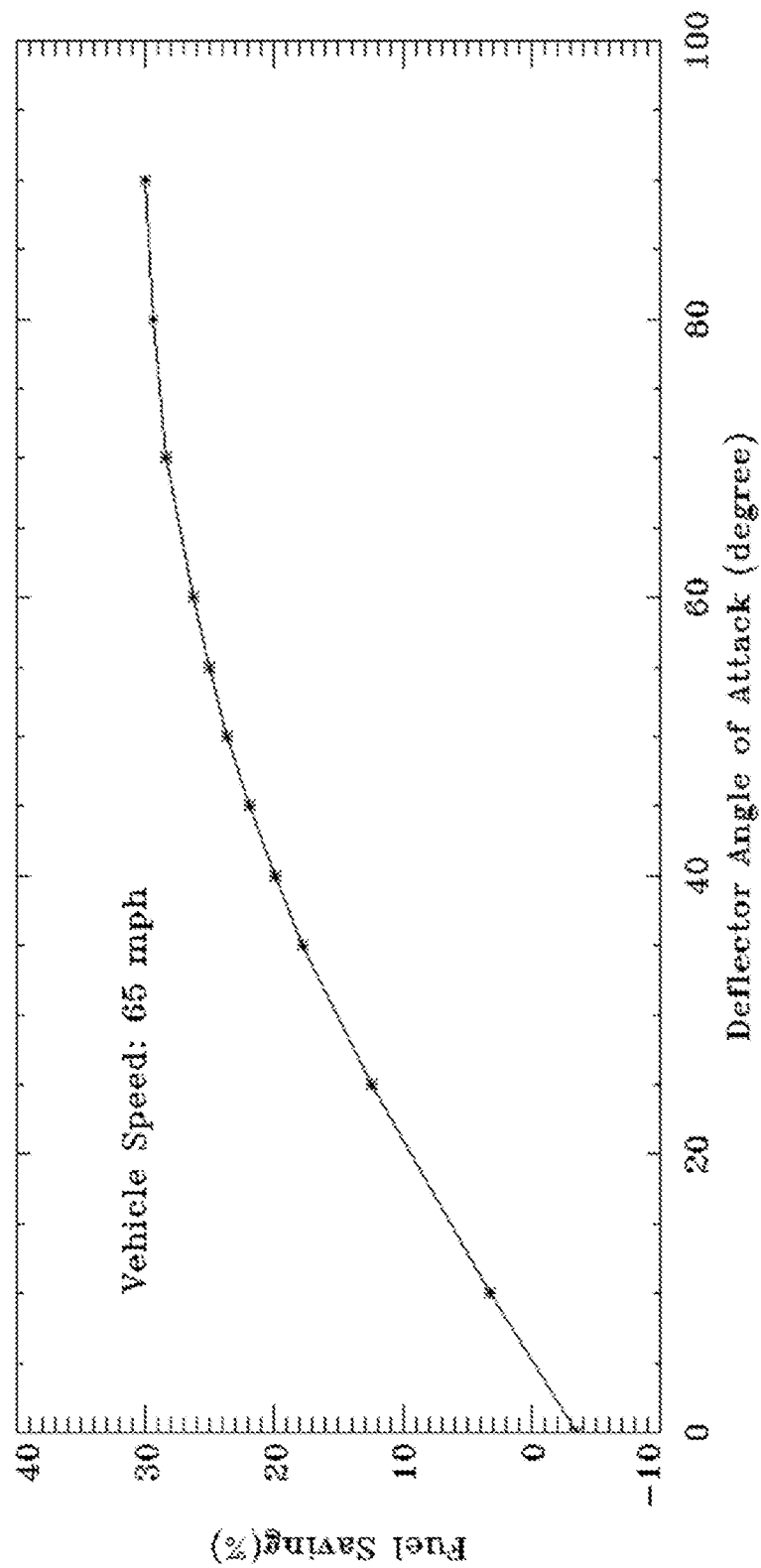
FIG. 8 is a chart of a simulated model system, depicting deflector angle of attack vs. projected fuel savings.

FIGS. 6 and 7 are schematic diagrams of supplemental propulsion system 202. Airflow deflector 214 is mounted to roof 204 at an angle of attack θ, which may include any suitable angle transverse to the roof surface (e.g., an acute angle or a right angle), configured to redirect the vehicle headwind in an upward direction. For example, angle θ may be approximately (or exactly) 70 degrees. However, as shown in FIG. 8, a range of values of angle θ may nevertheless result in fuel savings. In the example depicted in FIG. 8, an angle of attack greater than 5 degrees would achieve fuel savings, with a preferred angle of greater than or equal to approximately 35 degrees.

As shown in FIG. 7, various forces are present when the system is in operation. For example, airflow past the spinning rotor (clockwise in this view) causes a Magnus force orthogonal to the direction of airflow, and a drag force in the direction of the airflow. With respect to the airflow deflector, a drag is created in the general direction of the vehicle headwind, and a negative lift force is created, i.e., in the downward direction.

Figure 9:
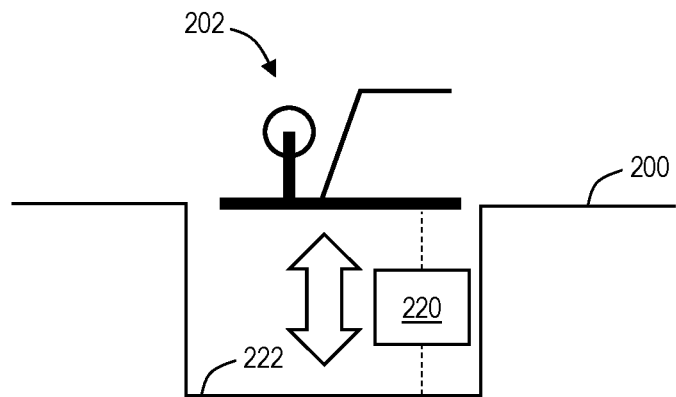
FIG. 9 is a schematic diagram of an illustrative rotor system configured to raise and lower, such that the system is convertible between in-use and stowed configurations.
Figure 10:
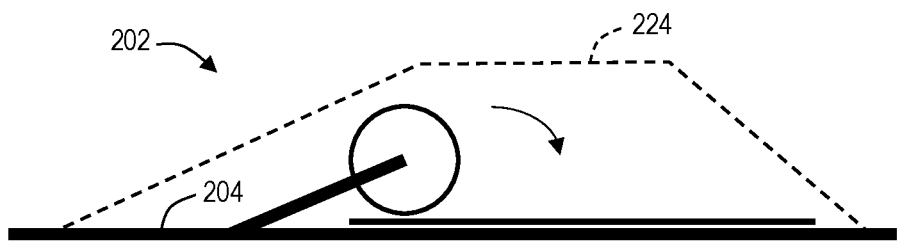
FIG. 10 is a schematic diagram of an illustrative rotor system configured to fold down into a stowed configuration.

FIGS. 9 and 10 depict illustrative versions of system 202 in which the rotor assembly is transitionable between a deployed configuration (as in FIGS. 2, 3, 6, and 7) and a stowed or collapsed configuration. In the example depicted in FIG. 9, system 202 is configured to be raised and lowered with respect to the roof of vehicle 200, although the system may be mounted in different locations on the vehicle (see FIGS. 12-14). For example, an actuator 220 may be utilized to elevate and lower the entire assembly as a whole, into and out of a recess 222 of the vehicle. Actuator 220 may include any suitable device, such as a linear actuator (e.g., a pneumatic or hydraulic cylinder), an elevator, a worm gear, a lead screw, a cantilevered platform coupled to an elevation mechanism, etc. In the example of FIG. 10, system 202 is configured to be pivoted flat (or relatively flat) onto roof 204. For example, the rotor mounts and airflow deflector may be releasably pivotable with respect to the roof. Optionally, whether or not system 202 is collapsible, a removable (e.g., aerodynamic) cover 224 (also referred to as a housing) may be utilized to protect the components and/or to reduce drag that would otherwise be cased by system 202 when not in use. In some examples, features of FIGS. 9 and 10 may be combined. For example, components may be configured to fold down into a recess formed in the roof or elsewhere on the vehicle. The features of FIGS. 9 and 10, or similar mechanisms, may be helpful to reduce an overall height of the vehicle, e.g., when passing under bridges or when travelling at low speeds.

Figure 11:
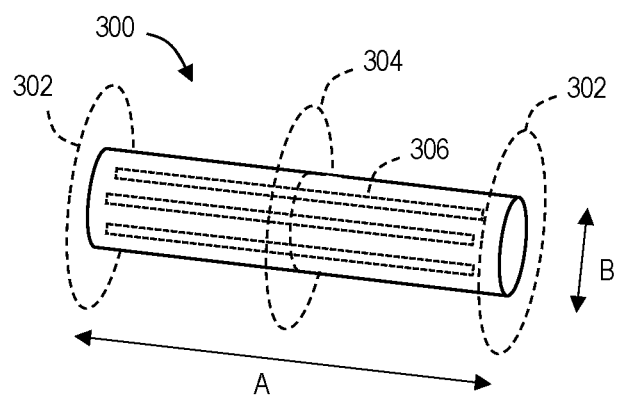
FIG. 11 is a schematic diagram of an illustrative cylinder suitable for use with systems of the present disclosure, depicting various optional features.

FIG. 11 depicts an illustrative cylinder 300 suitable for use in Flettner rotor 208 (or any other Flettner rotor of the present disclosure). Cylinder 300 is an elongate cylinder or tube, having an overall length A and a diameter B. Optionally, cylinder 300 may include endplates 302, each having a diameter larger than diameter B. In some examples, cylinder 300 includes one or more spanwise disks 304. In some examples, cylinder 300 includes one or more surface features 306. For example, surface features 306 may include any suitable axial splines, protrusions, surface roughening and/or texturing, grooves, coatings, and/or the like. In some examples, cylinder 300 may have a non-round cross section, e.g., to facilitate autorotation.

In some examples, supplemental wind propulsion systems described herein have at least four modes of operation, some or all of which may be automatically selectable by the electronic controller:

Powered-down mode: No power is provided. The system is in a stowed configuration and/or shielded from the external environment by an aerodynamic cover. This mode may be utilized during rain or snow events, when parked, etc.

Standby mode: The system is powered up but the rotor is not rotating. This mode may be utilized when the vehicle is moving at low speed, such as below 20 mph.

Forward mode: The motor rotates the cylinder in a first rotational direction at a high and constant relative speed ratio to provide supplemental propulsion to the vehicle.

Backward mode: The motor rotates the cylinder in a second rotational direction at a high and constant relative speed ratio to provide supplemental braking to the vehicle.

Figure 12:
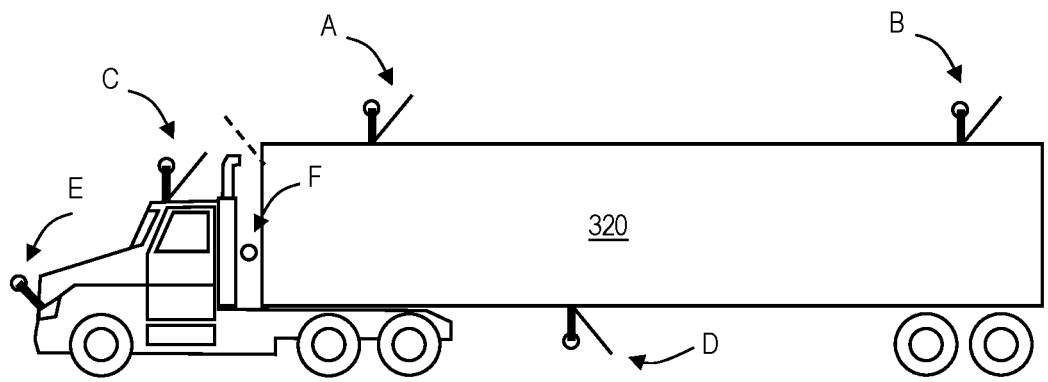
FIG. 12 is a schematic side view of a tractor-trailer depicting various suitable locations for mounting an illustrative horizontal Flettner rotor system according to the present teachings.
Figure 13:
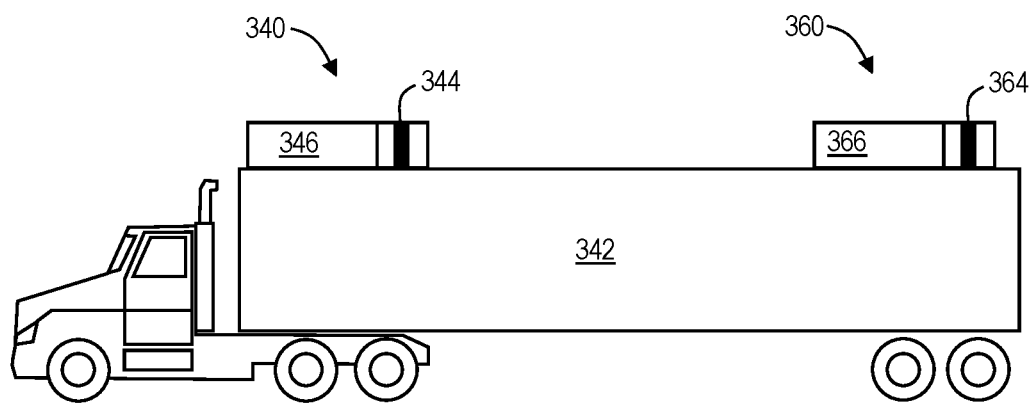
FIG. 13 is a schematic side view of a tractor-trailer, depicting an illustrative vertical Flettner rotor system according to the present teachings.
Figure 14:
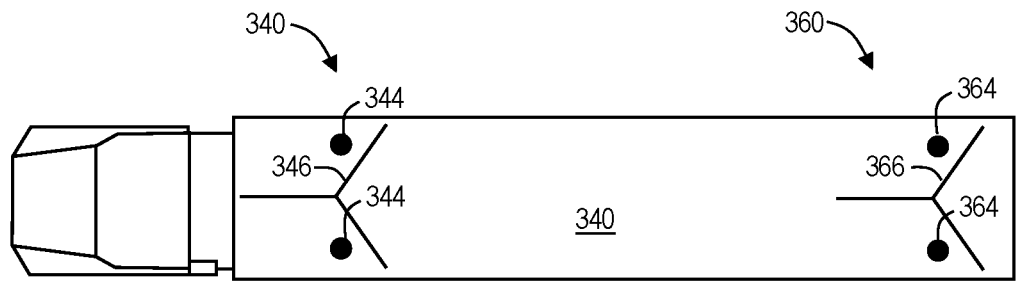
FIG. 14 is a top view of the tractor-trailer and rotor system of FIG. 13.

Turning to FIGS. 12-14, various suitable configurations and mounting positions for systems of the present disclosure will now be described with respect to an illustrative vehicle. FIG. 12 depicts a vehicle 320 in the form of a tractor trailer typically seen on American roadways. As shown, examples of supplemental vehicle propulsion system 100 may be mounted horizontally in any suitable location or locations on the vehicle. For example, systems are shown atop the vehicle roof at A and B, similar to the example of FIGS. 2 and 3. In some examples, a system may be mounted to vehicle 320 on an upper surface of the cab, as shown at C. In some examples, a system may be inverted and mounted under the trailer, as shown at D. In some examples, a system may be mounted on a front of the cab, as shown at E, in which case the front of the cab may be utilized as the air deflector. In some examples, airflow may be redirected downward between the cab and the trailer, past a rotor placed in that space, as indicated at F in FIG. 12.

FIGS. 13 and 14 depict vertically-mounted Flettner rotor systems 340, 360 in accordance with the present disclosure. In this example, two systems are mounted atop an illustrative vehicle 342. In each system, two spinning rotors 344, 364 are mounted upwind of an angled deflector 346, 366. Rotors 344, 364 may be shorter in length than horizontally-mounted rotors, due to overall height considerations of the vehicle. As may be seen in FIGS. 13 and 14, each deflector 346, 366 is Y-shaped when viewed from above, such that two faces of the deflector are oriented transverse to the headwind. Although Y-shaped deflectors having double rotors are shown and described in this example, a single transverse deflector and a single associated rotor may be utilized.

Figure 15:
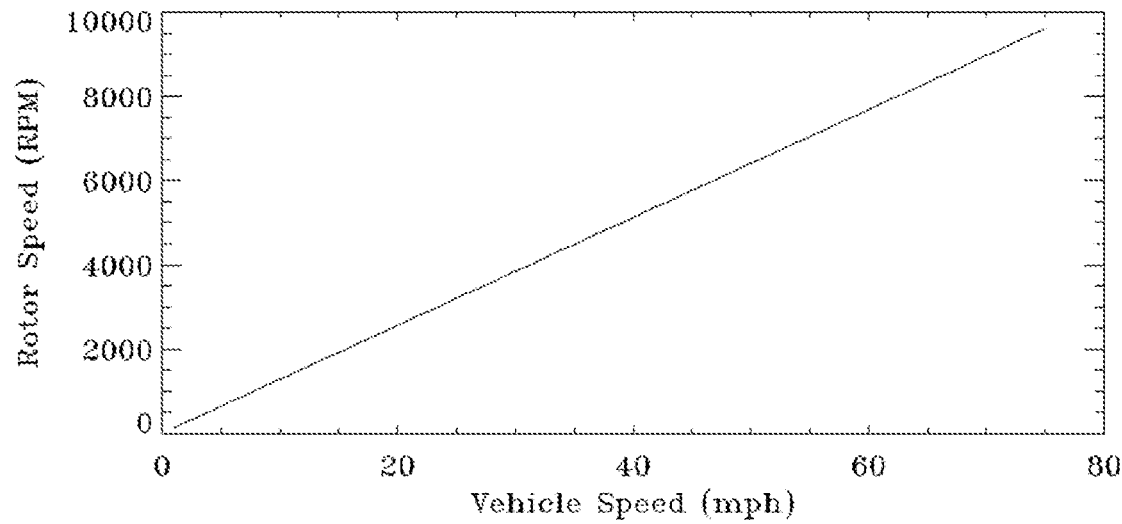
FIG. 15 is a first chart of a simulated model system, depicting rotor speed vs. vehicle speed.
Figure 16:
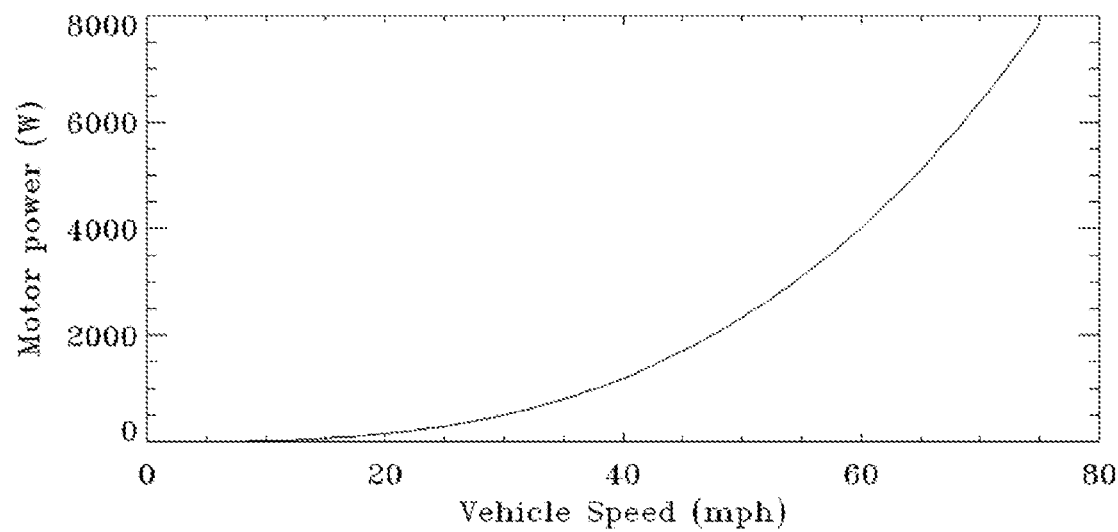
FIG. 16 is a second chart of a simulated model system, depicting motor power vs. vehicle speed.
Figure 17:
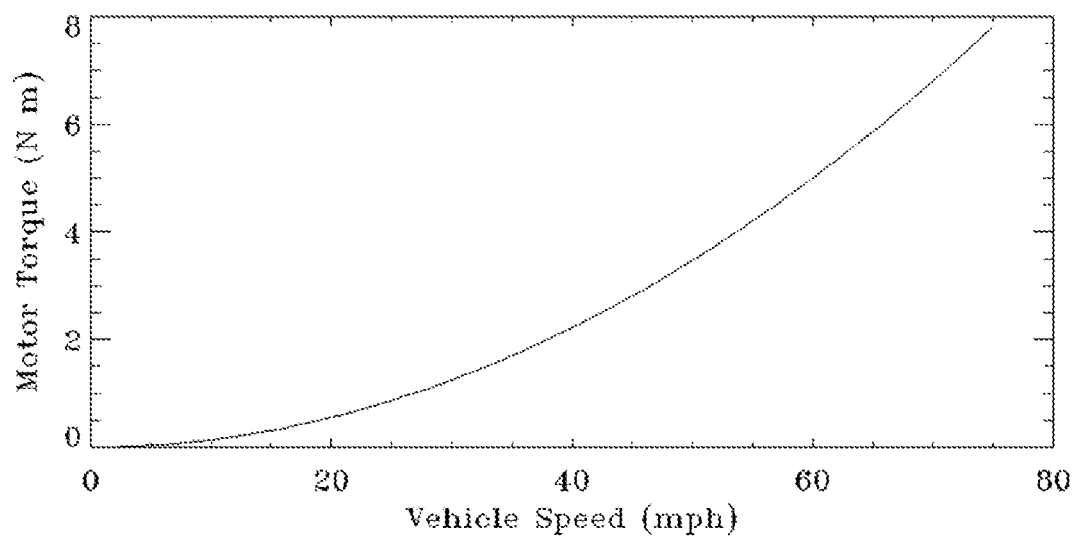
FIG. 17 is a third chart of a simulated model system, depicting motor torque vs. vehicle speed.
Figure 18:
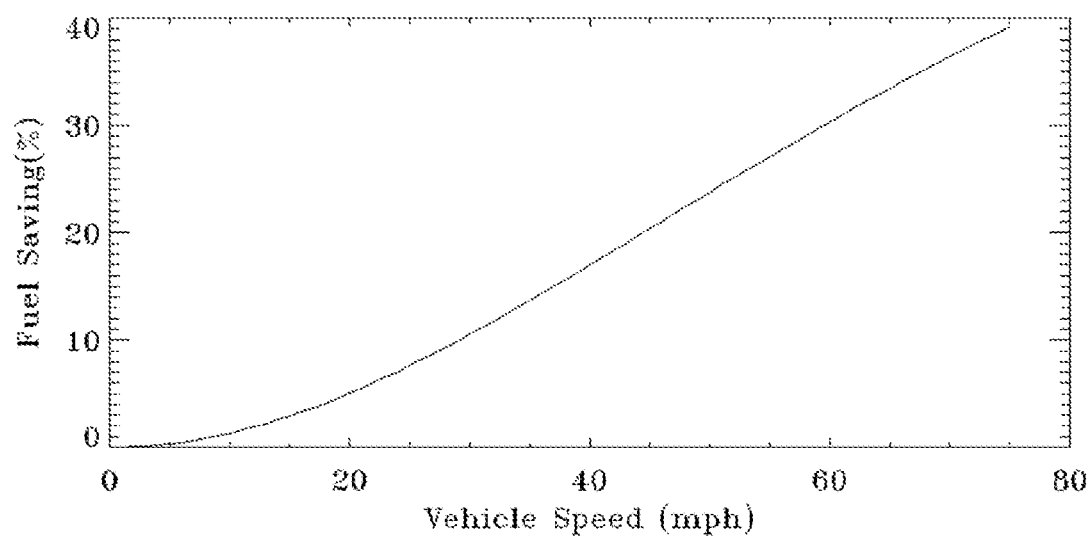
FIG. 18 is a fourth chart of a simulated model system, depicting percent fuel savings vs. vehicle speed.

FIGS. 15-18 are charts plotting various simulated parameters and performance results for a system having a horizontal Flettner rotor in accordance with aspects of the present disclosure. FIG. 15 depicts Flettner rotor speed in RPM vs. vehicle speed, with the relative speed ratio set at 3. Although a ratio of 3 is used here for illustration, a range of values will result in fuel savings. FIG. 16 depicts an example of Flettner rotor motor power vs. vehicle speed. FIG. 17 depicts an example of Flettner rotor motor torque vs. vehicle speed. FIG. 18 depicts predicted fuel savings vs. vehicle speed. As shown, the faster the vehicle goes, the more power required to drive the rotor, and the more energy savings result. The torque requirement is always relatively small for the simulated cylinder having a diameter of 20 cm. At a vehicle speed of 75 mph, the peak demands of rotor speed, torque, and power requirements are 8K RPM, 6 Nm, and 7.8 KW, respectively, all of which can be met by the off the shelf electric motors. The energy savings increases exponentially with vehicle speed. For an average semi-truck speed of 45 mph, the motor consumes 1.7 KW of power, and the resultant energy saving is about 20% for electric vehicle (EV) trucks and about 17% for ICE trucks. On interstate highways, semi-trucks often cruise at speed limits of 65 to 75 mph, resulting in energy savings of 33% and 39% while consuming 5.1 KW and 7.8 KW motor power, respectively, for EV trucks. The corresponding energy savings for ICE trucks is approximately 3% to 5% less.

For the above simulation, a Flettner rotor of 2 m in length and 20 cm in diameter was chosen, although any suitable length and diameter may be utilized. The aspect ratio in this example is therefore 10:1. To enhance the Magnus force (i.e., via the rotor lift coefficient) two endplates were also utilized, each having a diameter twice the diameter of the cylinder. When spinning at a velocity ratio of 3:1, the Flettner rotor generates a lift coefficient better than 14 and a drag coefficient of about 1.2.

Continuing with this example, to generate vertical laminar airflow, an airflow deflector is selected with a cross section that is three times that of the rotor. Accordingly, the aspect ratio for the deflector is about 3.3. In addition, the angle of attack is set at 70 degrees. A simple plate in this configuration has a drag coefficient less than 1.0 and lift coefficient of 0.4. These values are used as an approximation. With a smoother transition than a simple plate to maintain laminar airflow (see, e.g., FIGS. 4 and 5), the actual drag and lift coefficients for the deflector can be significantly smaller due the reduced turbulent airflow.

With the rotor system installed, fuel savings is estimated using a dynamic vehicle model. A vehicle in motion requires energy to overcome the resistive forces from aerodynamic drag, friction, gravity from road gradient, and inertia. For electric vehicles, a significant fraction of energy is recovered through regenerative braking during the vehicle deceleration. Regenerative braking was assumed in the present dynamic vehicle model. For internal combustion engine (ICE) vehicles, the braking efficiency is simply set to zero in the model.

The total energy required by a semi-truck without a Flettner rotor system installed is given by:

$$E_C = \left\{ \frac{\frac{1}{2}\rho C_d A v^3 + C_{rr} W_T g v + t_f W_T g v Z + \frac{1}{2} W_T v a}{\eta_{tw}} - \frac{1}{2} W_T v a \eta_{tw} \eta_{brk} \right\} T \quad (1)$$

where $E_c$ is the total energy consumption, v the average speed of the vehicle, ρ the density of the atmosphere, A the frontal area of the truck, $C_d$ the drag coefficient, $C_{rr}$ the coefficient of rolling resistance, $W_T$ the gross on-road vehicle weight, Z the road gradient, g the acceleration of gravity, a the mean acceleration and/or deceleration of the vehicle, $\eta_{tw}$ the tank-to-wheel efficiency, $\eta_{brk}$ the braking efficiency, and T the total travel time.

When cruising at speed v, the Flettner rotor will generate lift and drag forces on the vehicle, which are the combined lift and drag from the rotating Flettner rotor and airflow deflector, as illustrated in FIG. 7. Let $C_{LC}$ and $C_{DC}$ denote the lift and drag coefficients of the Flettner rotor, respectively. Let $C_{LD}$ and $C_{DD}$ denote the lift and drag coefficients of the airflow deflector, respectively. Their combined forces are then as follows:

$$F_x = \frac{1}{2}\rho C_{LC} A_r d^2 v^2 \sin(\theta) - \frac{1}{2}\rho C_{DC} A_r d^2 v^2 \cos(\theta) - \frac{1}{2}\rho C_{DD} A_p v^2 \quad (2)$$

$$F_y = \frac{1}{2}\rho C_{LC} A_r d^2 v^2 \cos(\theta) + \frac{1}{2}\rho C_{DC} A_r d^2 v^2 \sin(\theta) - \frac{1}{2}\rho C_{LD} A_p v^2 \quad (3)$$

where θ is the angle of attack for the deflector. The power created by $F_x$ and the weight reduction provided by $F_y$ will result in net energy saving as:

$$E_S = \left\{ \frac{F_x v + C_{rr} F_y v + t_f F_y v Z}{\eta_{tw}} + \frac{1}{2g} F_y v a (1/\eta_{tw} - \eta_{tw} \eta_{brk}) \right\} N_c T \quad (4)$$

Where $N_c$ is the number of rotors installed. Given the length of a typical semi-truck, two or more rotor systems may be installed without creating significant aerodynamic interference between them. The last term in Equation (4) is set to zero for two reasons: (1) the time for the vehicle to accelerate to cruising speed is usually short, we assume the rotor is not yet operational during this period; nevertheless the energy spent to overcome inertia is usually quite small comparing that of the aerodynamic drag and rolling resistance. (2) In the case of the rotor being operational from the beginning, the force $F_y$ is a function of accelerating vehicle speed, so the last term is only a rough estimation. Setting the last term to zero leads to an underestimation of the rotor system's performance in terms of energy saving, making these calculations conservative.

On the other hand, energy $E_r$ is needed to drive the rotor:

$$E_r = \frac{1}{2}\rho C_P A_r d^2 v^3 T / \eta \quad (5)$$

Where η is the electric motor efficiency and $C_P$ is the power coefficient of the rotor:

$$C_p = \pi \alpha^3 C_f \quad (6)$$

Where α is the rotor velocity ratio, $C_f$ is the skin friction coefficient. The percentage energy saving is given by:

$$G = (E_S - E_r)/E_c \times 100\% \quad (7)$$

The above dynamic vehicle model can be applied to all types of vehicles. For vehicles without regenerative braking, set $\pi_{brk}=0$. Although the tank-to-wheel efficiency $\pi_{tw}$ varies dramatically with vehicle fuel and energy types, the energy saving parameter G has a small dependence on $\eta_{tw}$. This is because the $E_C$ and $E_S$ have similar dependence on $\eta_{tw}$, which will be partially cancelled in their ratio. The term $E_r$ is much smaller than $E_c$ and $E_s$ and has little impact on G. Therefore, the estimated energy savings are similar for both electric and ICE semi-trucks.

B. Illustrative Method

Figure 19:
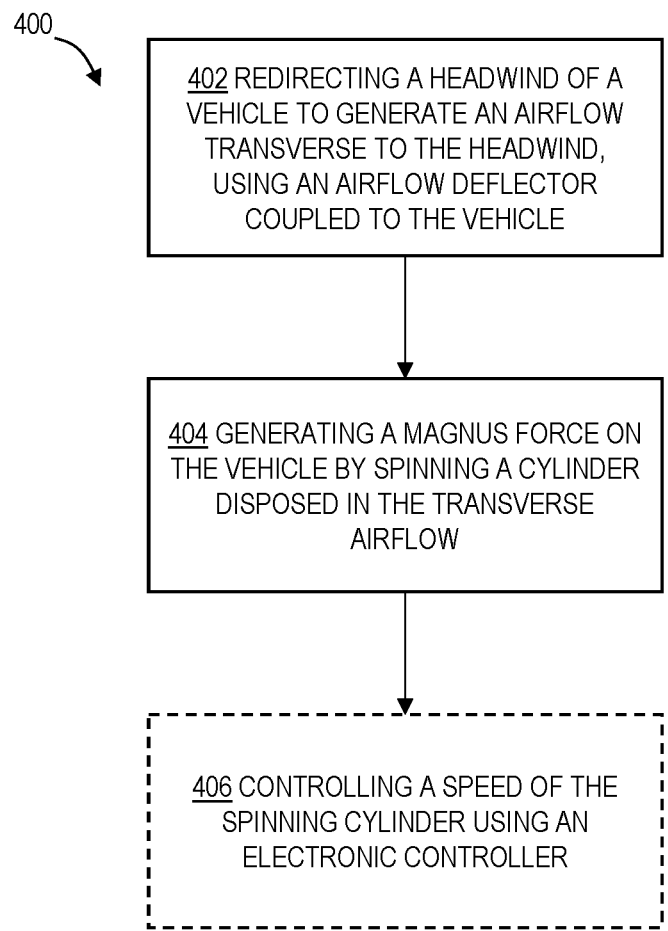
FIG. 19 is a flow chart depicting steps of an illustrative method for reducing fuel consumption in a land-based vehicle.

This section describes steps of an illustrative method 400 for providing supplemental propulsion to a vehicle; see FIG. 19. Aspects of the systems describe above may be utilized in the method steps described below. Where appropriate, reference may be made to components and systems that may be used in carrying out each step. These references are for illustration, and are not intended to limit the possible ways of carrying out any particular step of the method.

FIG. 19 is a flowchart illustrating steps performed in an illustrative method, and may not recite the complete process or all steps of the method. Although various steps of method 400 are described below and depicted in FIG. 19, the steps need not necessarily all be performed, and in some cases may be performed simultaneously or in a different order than the order shown.

Step 402 of method 400 includes redirecting a headwind of a vehicle to generate an airflow transverse to the headwind, i.e., transverse to the longitudinal axis of the vehicle or transverse to the direction of travel (e.g., upward or lateral flow), using an airflow deflector coupled to the vehicle. In some examples, the vehicle may be a tractor-trailer or semi-truck. In some examples, the airflow deflector includes a planar expanse oriented transverse to a roof of the vehicle. In some examples, the airflow deflector has a curvilinear profile. In some examples, the airflow deflector has an angle of attack of at least 5 degrees, at least 35 degrees, or at least 70 degrees. In some examples, a general direction of the transverse airflow is at an angle less than 90 degrees with respect to the longitudinal axis of the vehicle. In some examples, multiple airflow deflectors and rotors may be utilized, resulting in additional savings. In those examples, lower angles of attack may be utilized, to achieve similar overall savings.

Step 404 of method 400 includes generating a Magnus force on the vehicle by spinning a horizontal or vertical cylinder disposed in the transverse airflow. In horizontal examples, the cylinder is oriented lengthwise across a width of the vehicle. In vertical examples, the cylinder is oriented with its length running vertically. In some examples, spinning the cylinder includes spinning the cylinder using an electric motor, e.g., a hub motor. In some examples, the cylinder includes a pair of endplates sized larger than a diameter of the cylinder (e.g., at least twice as large).

Step 406 of method 400 includes controlling a speed of the spinning cylinder using an electronic controller. In some examples, controlling the speed is based at least in part on an airflow speed input from an anemometer. In some examples, controlling the speed is based at least in part on a speed of the vehicle. In some examples, controlling the speed may include maintaining a rotational speed of the cylinder based on a multiple of a speed of the vehicle. In some examples, controlling the speed may include maintaining a rotational speed of the cylinder based on a multiple of a speed of the airflow past the cylinder. In some examples, the electronic controller may be referred to as a motor controller.

C. Illustrative Combinations and Additional Examples

This section describes additional aspects and features of supplemental propulsion system for vehicles, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A supplemental propulsion system for a vehicle, the system comprising:
a Flettner rotor including a rotatable cylinder mounted to a vehicle, such that a length of the cylinder is oriented transverse to a direction of travel of the vehicle; and an airflow deflector disposed on the vehicle behind the Flettner rotor, wherein the airflow deflector is configured to redirect a vehicle headwind to generate an airflow past the cylinder in a direction transverse to the direction of travel.

A1. The system of A0, wherein the cylinder of the Flettner rotor is mounted in a horizontal orientation.

A2. The system of A0, wherein the cylinder of the Flettner rotor is mounted in a vertical orientation.

A3. The system of A0, wherein the rotor is driven by an electric motor, e.g., a hub motor.

A4. The system of any one of paragraphs A0 through A3, wherein the cylinder has a length to diameter ratio of 10:1 (or greater).

A5. The system of any one of paragraphs A0 through A4, wherein the cylinder further comprises a pair of endplates each having a transverse dimension greater than or equal to a diameter of the cylinder.

A6. The system of A5, wherein the endplates have a diameter at least twice as large as the diameter of the cylinder.

A7. The system of A0, further comprising:
a motor configured to rotate the cylinder; and
an electronic controller configured to control the motor such that a rotational speed of the cylinder is maintained at a selected multiple of a speed of the transverse airflow past the cylinder.

A8. The system of A7, further comprising an anemometer in communication with the electronic controller, wherein the anemometer is configured to measure the speed of the redirected airflow.

A9. The system of A8, wherein the electronic controller bases the rotational speed of the cylinder at least in part on air speed information received from the anemometer.

A10. The system of A7, wherein the speed of the redirected airflow is estimated based on a speed of the vehicle.

A11. The system of any A10, wherein the selected multiple is 3.

A12. The system of A11, wherein the selected multiple is at least 3.

A13. The system of any one of paragraphs A0 through A12, wherein the system is transitionable between a deployed configuration, in which the cylinder and the airflow deflector are exposed to a headwind of the vehicle, and a stowed configuration, in which the cylinder and the airflow deflector are covered by an aerodynamic housing.

A14. The system of any one of paragraphs A0 through A13, wherein the system is transitionable between a deployed configuration, in which the cylinder and the airflow deflector are exposed to a headwind of the vehicle, and a stowed configuration, in which the cylinder and the airflow deflector are lowered out of the headwind and into a recess of the vehicle.

A15. The system of any one of paragraphs A0 through A13, wherein the system is transitionable between a deployed configuration, in which the cylinder and the airflow deflector are exposed to a headwind of the vehicle, and a stowed configuration, in which the cylinder and the airflow deflector are pivoted downward against a surface of the vehicle.

A16. The system of any one of paragraphs A0 through A15, the cylinder further comprising one or more spanwise-spaced disks, axial splines, protrusions, surface roughening, grooves, and/or coatings.

A17. The system of any one of paragraphs A0 through A16, wherein the cylinder has a non-round cross section.

A18. The system of any one of paragraphs A0 through A17, wherein the airflow deflector comprises a planar expanse.

A19. The system of any one of paragraphs A0 through A18, wherein the airflow deflector has a curvilinear profile when viewed from a side of the vehicle.

A20. The system of any one of paragraphs A0 through A19, wherein the airflow deflector has an angle of attack equal to or greater 5 degrees (e.g., greater than or equal to 35 degrees).

B0. A method for providing supplemental propulsion to a vehicle, the method comprising:
redirecting a headwind of a vehicle to generate an airflow transverse to the headwind, using an airflow deflector coupled to the vehicle; and
generating a Magnus force on the vehicle by spinning a cylinder disposed in the redirected airflow.

B1. The method of B0, wherein the vehicle comprises a land-based motor vehicle, such as a tractor and a trailer.

B2. The method of B0, wherein the cylinder is oriented lengthwise across a width of the vehicle.

B3. The method of B2, wherein the airflow deflector comprises a planar expanse oriented transverse to a roof of the vehicle, e.g., having a face oriented transverse to the headwind direction.

B4. The method of B0, wherein the airflow deflector has a curvilinear profile.

B5. The method of B0, wherein spinning the horizontal cylinder comprises spinning the cylinder using an electric motor, e.g., a hub motor.

B6. The method of B4, further comprising controlling a speed of the spinning cylinder using an electronic controller.

B7. The method of B6, wherein controlling the speed is based at least in part on an airflow speed input from an anemometer.

B8. The method of B6, wherein controlling the speed is based at least in part on a speed of the vehicle.

B9. The method of B0, wherein the airflow deflector has an angle of attack of at least 5 degrees.

B10. The method of B9, wherein the airflow deflector has an angle of attack of at least 35 degrees.

B10. The method of B0, wherein the cylinder includes a pair of endplates sized larger than a diameter of the cylinder.

B11. The method of B0, further comprising maintaining a rotational speed of the cylinder based on a multiple of a speed of the vehicle.

B12. The method of any one of paragraphs B0 through B11, wherein a general direction of the redirected airflow relative to a direction of travel of the vehicle is at an angle less than 90 degrees.

C0. In some examples, the Flettner rotor may have a geometric shape configured to facilitate autorotation, such as a flat plate, a thin elliptical cylinder, a cruciform plate, a triangular prism, a rectangular prism with a square cross section, a Savonius rotor, and/or other suitable shapes configured to facilitate rotor function without the use of a motor.

An autorotatable Flettner rotor may be used without a motor or in conjunction with a motor to increase vehicular efficiency at low speeds.

D0. In some examples, the Flettner rotor may include selected surface textures configured to increase lift and torque coefficients of the rotor.

D1. In some examples, these surface textures may result from the rotor materials used, such as sanded metal, smooth metal, wood, and/or other suitable rotor materials.

D2. In some examples, these surface textures may result from surface modifications such as coatings (e.g., with aluminum oxide particles), dimpling (similar to the surface of a golf ball), the inclusion of axial fins and/or splines, and/or other suitable surface modifications configured to affect air flow around the cylinder.

E0. In some examples, the Flettner rotor may include disks spaced spanwise along the length of the rotor cylinder, such as in a Thom rotor. In some examples, the disks may be spaced at intervals between 0.75 times the diameter of the rotor cylinder and 1.25 times the diameter of the rotor cylinder.

F0. A supplemental propulsion system for a vehicle, the system comprising:
a Flettner rotor including a rotatable cylinder mounted to a vehicle, such that a length of the cylinder is oriented transverse to a direction of travel of the vehicle;
an airflow deflector disposed on the vehicle behind the Flettner rotor, wherein the airflow deflector is configured to redirect a vehicle headwind to generate an airflow past the cylinder in a direction transverse to the direction of travel;
a motor configured to rotate the cylinder; and
an electronic controller configured to control the motor such that a rotational speed of the cylinder is maintained at a selected multiple of a speed of the transverse airflow past the cylinder.

Advantages, Features, and Benefits

The different embodiments and examples of the supplemental propulsion systems for vehicles described herein provide several advantages over known solutions. For example, illustrative embodiments and examples described herein may be added onto existing vehicles and/or incorporated into new vehicles, including seagoing vessels, aircraft, and/or land (e.g., medium- and heavy-duty) vehicles at low cost.

Additionally, and among other benefits, illustrative embodiments and examples described herein create a new green technology to recycle the artificial wind energy lost due to the motion of surface vehicles or vessels through the air, which can nevertheless be viewed as a new source of renewable energy. In principle, it can be applied to all types of surface (ground and ocean) and subsurface transportation. If widely adopted, this technology can greatly improve vehicle fuel efficiency and dramatically reduce human made carbon emission, thus reducing human impact on the climate.

Additionally, and among other benefits, illustrative embodiments and examples described herein harness an existing source of wind energy (i.e., vehicle headwind) currently only contributing negatively in the form of vehicle drag.

Additionally, and among other benefits, illustrative embodiments and examples described herein can be used as an air brake by reversing the rotating direction of the cylinder. The performance of such a brake does not depend on road conditions since it uses the Magnus force from airflow to stop the vehicle.

Additionally, and among other benefits, by using variable configuration between the airflow deflector and the rotor, devices described herein may be used to provide additional road traction.

Additionally, and among other benefits, illustrative embodiments and examples described herein improve energy efficiency for vehicles, such as medium- and heavy-duty trucks, thereby reducing their emissions. This is not only an economical issue but also public health, environment, and energy security issue.

Additionally, and among other benefits, illustrative embodiments and examples described herein provide a 25% fuel savings, assuming an average interstate speed of 60 mph. Assuming an annual travel distance of 100K miles, 6 mpg, and a diesel price of $3/gallon, this translates to over $12,500 in annual fuel cost reduction per semi-truck, or 46 US tons of $CO_2$ emissions per truck per year.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A supplemental propulsion system for a vehicle, the system comprising:
    a Flettner rotor including a rotatable cylinder mounted to a vehicle, such that a length of the cylinder is oriented transverse to a direction of travel of the vehicle; and
    an airflow deflector disposed on the vehicle behind the Flettner rotor, wherein the airflow deflector is configured to redirect a vehicle headwind to generate an airflow past the cylinder in a direction transverse to the direction of travel at a cost of additional air drag to the vehicle;
    wherein the rotor and the airflow deflector are disposed on the vehicle such that the rotor and the airflow deflector collectively generate a propulsion force in the direction of travel of the vehicle when the cylinder is back-spinning in the generated airflow.

2. The system of claim 1, wherein the cylinder of the Flettner rotor is mounted in a horizontal orientation.

3. The system of claim 1, wherein the cylinder of the Flettner rotor is mounted in a vertical orientation.

4. The system of claim 1, wherein the cylinder has a length to diameter ratio of 10:1 or greater.

5. The system of claim 1, wherein the cylinder further comprises a pair of endplates having a same diameter larger than a diameter of the cylinder, wherein the endplates are configured to rotate with the cylinder.

6. The system of claim 1, further comprising:
    a motor configured to rotate the cylinder; and
    an electronic controller configured to control the motor such that a rotational speed of the cylinder is maintained at a selected multiple of a speed of the airflow past the cylinder.

7. The system of claim 6, wherein the motor comprises a hub motor.

8. The system of claim 6, further comprising an anemometer in communication with the electronic controller, wherein the anemometer is configured to measure the speed of the airflow past the cylinder.

9. The system of claim 8, wherein the electronic controller bases the rotational speed of the cylinder at least in part on air speed information received from the anemometer.

10. The system of claim 6, wherein the speed of the airflow past the cylinder is estimated based on a speed of the vehicle.

11. The system of claim 1, wherein the airflow deflector comprises a planar expanse.

12. The system of claim 1, wherein the airflow deflector has an angle of attack equal to or greater than 5 degrees.

13. A supplemental propulsion system of claim 1, wherein the cylinder is mounted to a body of the vehicle, and is spaced apart from any edge formed by two surfaces of the body of the vehicle.

14. A method for providing supplemental propulsion to a vehicle, the method comprising:
    redirecting a headwind of a vehicle to generate a redirected airflow transverse to the headwind at a cost of additional air drag to the vehicle, using an airflow deflector coupled to the vehicle; and
    generating a Magnus force on the vehicle by back-spinning a cylinder disposed in the redirected airflow;
    wherein the airflow deflector and the cylinder are disposed such that the rotor and the airflow deflector collectively generate a propulsion force in the direction of travel of the vehicle.

15. The method of claim 14, wherein the cylinder is oriented lengthwise across a width of the vehicle.

16. The method of claim 14, wherein the airflow deflector comprises a planar expanse having a face oriented transverse to the headwind.

17. The method of claim 14, wherein the airflow deflector has a curvilinear profile.

18. The method of claim 14, further comprising controlling a speed of the spinning cylinder using an electronic controller coupled to an electric motor.

19. The method of claim 18, wherein controlling the speed is based at least in part on an airflow speed input from an anemometer.

20. The method of claim 18, wherein controlling the speed is based at least in part on a speed of the vehicle.

21. The method of claim 14, wherein the airflow deflector has an angle of attack of at least 5 degrees.

22. A method for providing supplemental propulsion to a vehicle, the method comprising:
    redirecting a headwind of a vehicle to generate a redirected airflow transverse to the headwind, using an airflow deflector coupled to the vehicle; and generating a Magnus force on the vehicle by spinning a cylinder disposed in the redirected airflow;

wherein the airflow deflector comprises a planar expanse having a face oriented transverse to the headwind.

23. A method for providing supplemental propulsion to a vehicle, the method comprising:

redirecting a headwind of a vehicle to generate a redirected airflow transverse to the headwind, using an airflow deflector coupled to the vehicle; and generating a Magnus force on the vehicle by spinning a cylinder disposed in the redirected airflow;

wherein the airflow deflector has an angle of attack of at least 5 degrees.

24. A method for providing supplemental propulsion to a vehicle, the method comprising:

redirecting a headwind of a vehicle to generate a redirected airflow transverse to the headwind, using an airflow deflector coupled to the vehicle;

generating a Magnus force on the vehicle by spinning a cylinder disposed in the redirected airflow; and controlling a speed of the spinning cylinder using an electronic controller coupled to an electric motor, wherein controlling the speed is based at least in part on an airflow speed input from an anemometer.

25. A supplemental propulsion system for a vehicle, the system comprising:

a Flettner rotor including a rotatable cylinder mounted to a vehicle, such that a length of the cylinder is oriented transverse to a direction of travel of the vehicle; and an airflow deflector disposed on the vehicle behind the Flettner rotor, wherein the airflow deflector comprises a planar expanse configured to redirect a vehicle headwind to generate an airflow past the cylinder in a direction transverse to the direction of travel.

26. A supplemental propulsion system for a vehicle, the system comprising:

a Flettner rotor including a rotatable cylinder mounted to a vehicle, such that a length of the cylinder is oriented transverse to a direction of travel of the vehicle; and an airflow deflector disposed on the vehicle behind the Flettner rotor, wherein the airflow deflector is configured to redirect a vehicle headwind to generate an airflow past the cylinder in a direction transverse to the direction of travel;

wherein the airflow deflector has an angle of attack equal to or greater than 5 degrees.

27. A supplemental propulsion system for a vehicle, the system comprising:

a Flettner rotor including a rotatable cylinder mounted to a vehicle, such that a length of the cylinder is oriented transverse to a direction of travel of the vehicle;

an airflow deflector disposed on the vehicle behind the Flettner rotor, wherein the airflow deflector is configured to redirect a vehicle headwind to generate an airflow past the cylinder in a direction transverse to the direction of travel;

a hub motor configured to rotate the cylinder; and an electronic controller configured to control the motor such that a rotational speed of the cylinder is maintained at a selected multiple of a speed of the airflow past the cylinder.

28. A supplemental propulsion system for a vehicle, the system comprising:

a Flettner rotor including a rotatable cylinder mounted to a vehicle, such that a length of the cylinder is oriented transverse to a direction of travel of the vehicle;

an airflow deflector disposed on the vehicle behind the Flettner rotor, wherein the airflow deflector is configured to redirect a vehicle headwind to generate an airflow past the cylinder in a direction transverse to the direction of travel;

a motor configured to rotate the cylinder;

an electronic controller configured to control the motor such that a rotational speed of the cylinder is maintained at a selected multiple of a speed of the airflow past the cylinder; and an anemometer in communication with the electronic controller, wherein the anemometer is configured to measure the speed of the airflow past the cylinder.

* * * * *